A. H. CROZIER & C. CARRIER.
MACHINE FOR CAMFERING AND CROZING BARRELS.
No. 21,117.
PATENTED AUG. 10, 1858.
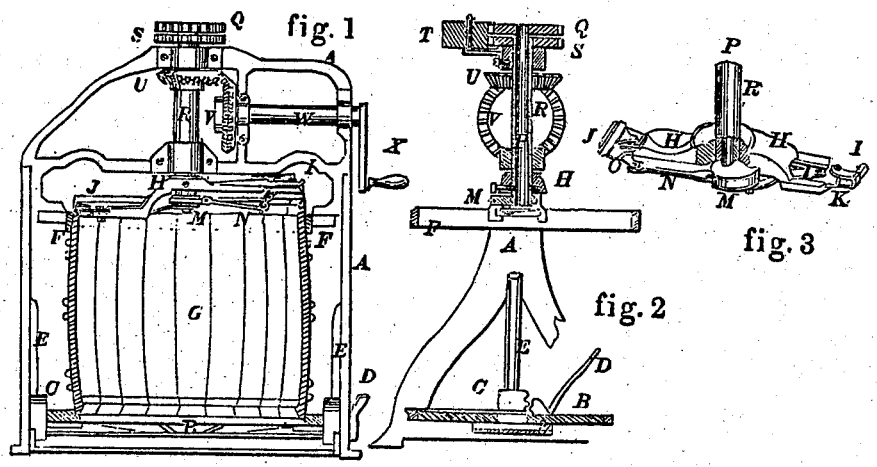
ONLY DRAWING ACCESSIBLE
TAKEN FROM PATENT OFFICE REPORT
1858 - VOL. III.

UNITED STATES PATENT OFFICE.

A. H. CROZIER AND C. CARRIER, OF OSWEGO, NEW YORK.

MACHINE FOR CHAMFERING AND CROZING BARRELS.

Specification of Letters Patent No. 21,117, dated August 10, 1858.

*To all whom it may concern:*

Be it known that we, A. H. CROZIER and CYRUS CARRIER, both of Oswego, in the State of New York, have invented an Improved Machine for Chamfering and Crozing Barrels, &c.; and we do hereby declare the following to be a correct description of the same, reference being had to the accompanying drawings, in which—

Figure 1, is a side elevation of the machine; Fig. 2, is a transverse vertical section of the same; Fig. 3, is an enlarged view of the cutter stock and cutters, showing the mode of operating the latter; Fig. 4, is a top view of the spur wheels and pinion attached to the vertical shafts; Fig. 5, is a perspective view of the machine complete.

The same letter indicates the same part in all the figures.

The nature of our invention consists in the mode, hereinafter more particularly described, of causing the crozing and chamfering tools to advance to, and recede from, the work as required. In the drawings, A marks the frame of the machine; B, platform for the barrel; C, rack attached to the side of the platform; D, foot lever working segments of pinions which gear into rack, C, to raise and lower platform B; E, guides upon which B rises and falls; F, hoop to receive upper end of barrel; G, section of barrel in position to be operated upon; H, cutter stock; I, crozing tool; J, chamfering tool; K, slide of crozing tool; L, arm operating slide K; M, cam or eccentric; N, arm operated by M; O, arm of chamfering tool; P, solid shaft of cam M; Q, spur wheel at top of shaft P; R, hollow shaft of cutter stock H; S, spur wheel at top of hollow shaft R; T, friction pinion gearing into spur wheels Q and S; U, bevel wheel by which shaft R is driven; V, bevel wheel attached to driving shaft and gearing into wheel U; W main or driving shaft; X winch.

To enable others to make and use our machine, we will proceed more particularly to describe its construction and operation.

The frame of the machine we make of cast iron. Near the bottom, we place a circular platform, B, on which the barrel to be operated upon is to rest. This platform has racks, C, attached to its sides, which receive the teeth of segmental pinions, C', connected by a rod, as shown, and worked by the foot lever D. By means of these racks and pinions, the platform B, is raised or lowered, as described, in order to present the barrel, which is placed upon it, to the action of the crozing and chamfering tools I and J. These tools are placed one at either end of cutter stock H, and, by its revolution, are caused to cut the croze and chine of the barrel. The crozing tool, I, is attached to a sliding disk, K, working out and in, in guides in the end of the cutter stock. The reciprocating motion of this is imparted to it by arm L, attached by a pin to cam M, by the revolution of which it is driven. The motion of this disk, K, carries the tool I, to and from its work in the manner required. The chamfering tool, J, has a rack upon its inner side, gearing with a segmental pinion, worked by arms, O and N, which are connected by a band to cam M, and operated by the revolution of this cam. The tool J is thus advanced and retracted in the required manner as the work is in progress.

The cam M, is attached firmly to the lower end of solid shaft P, which passes up through hollow shaft R, and receives, at top, a spur wheel Q.

In Fig. 3, the hollow shaft and cutter stock are shown broken away, in order more clearly to display this arrangement. The hollow shaft is firmly attached at its lower end to the cutter stock H, and at its upper end to spur wheel S. It also has attached to it bevel wheel U, by which it is driven. Bevel wheel U, gears into bevel wheel V, on main shaft W, which is revolved by means of winch X, or other suitable prime mover. Wheels Q and S, both gear into pinion T, which is driven by wheel S, and drives wheel Q. These spur wheels are alike in diameter, but wheel S, which is attached to the hollow shaft, has one tooth more than wheel Q, (see Fig. 4.) Hence the inner shaft P, attached to Q, will gain one revolution, while the outer shaft is making as many revolutions as there are teeth in wheel S. This differential movement of shaft P, gives to cam M, at its lower end, the requisite amount of motion to cause the tools, I and J, to advance and recede from the work with the requisite velocity and regularity.

The barrel is first set up in truss hoops. It is then placed on the platform of the machine, and, by the foot lever D, is thrown up into hoop F, where it is held firmly while the process of cutting the chine and croze is in progress. It is then taken down, without stopping the machine, which is kept in constant motion as long as there is work to be done.

What we claim and desire to secure by Letters Patent is—

The method hereinbefore described of moving the crozing and chamfering tools to and from their work by means of the differential movement of the wheels Q and S produced in the manner described, when operating the cam or eccentric which controls the action of the tools, all substantially as specified.

The above specification signed and witnessed this twenty-sixth day of April, 1858.

A. H. CROZIER.
   CYRUS CARRIER.

Witnesses:
 JOHN KELLY,
 WM. H. SHUMWAY.